Oct. 3, 1944.  M. O. SEARLE  2,359,532
APPARATUS FOR APPLYING INSULATING TUBING
ON WIRE CABLES, CONDUITS, AND THE LIKE
Filed May 2, 1942  3 Sheets-Sheet 3
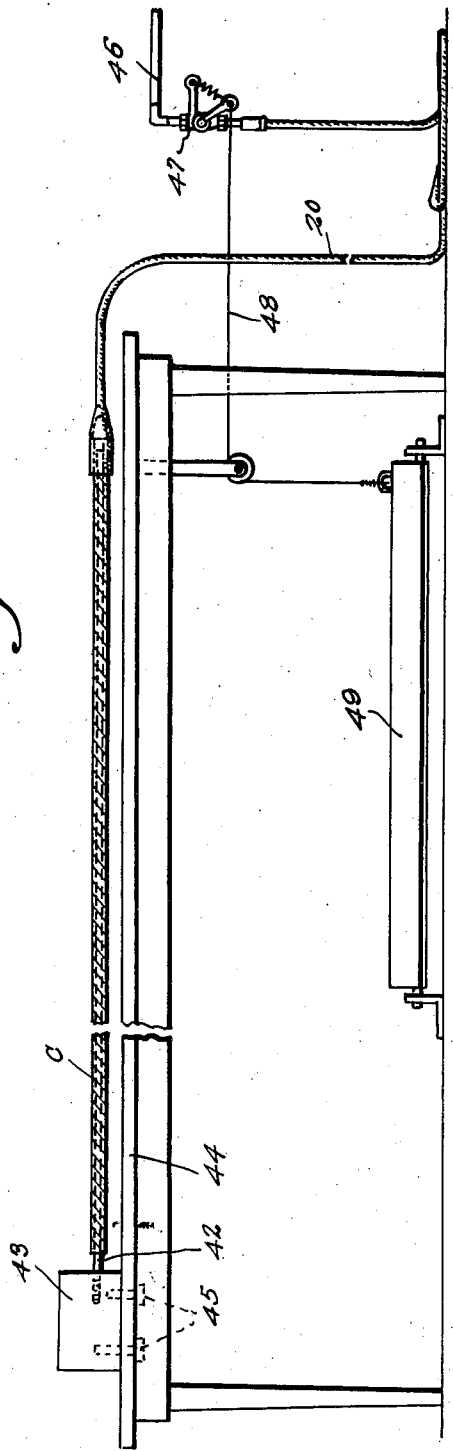
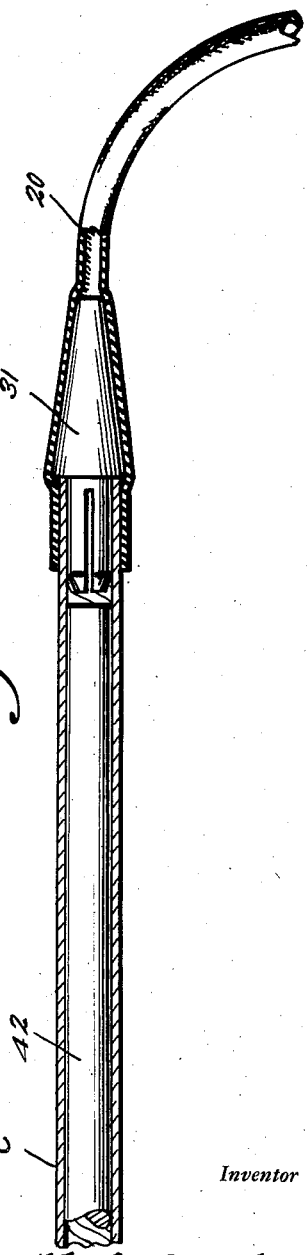
Inventor
Marshall O. Searle
By Clarence A. O'Brien
and Harvey B. Jackson
Attorneys Patented Oct. 3, 1944

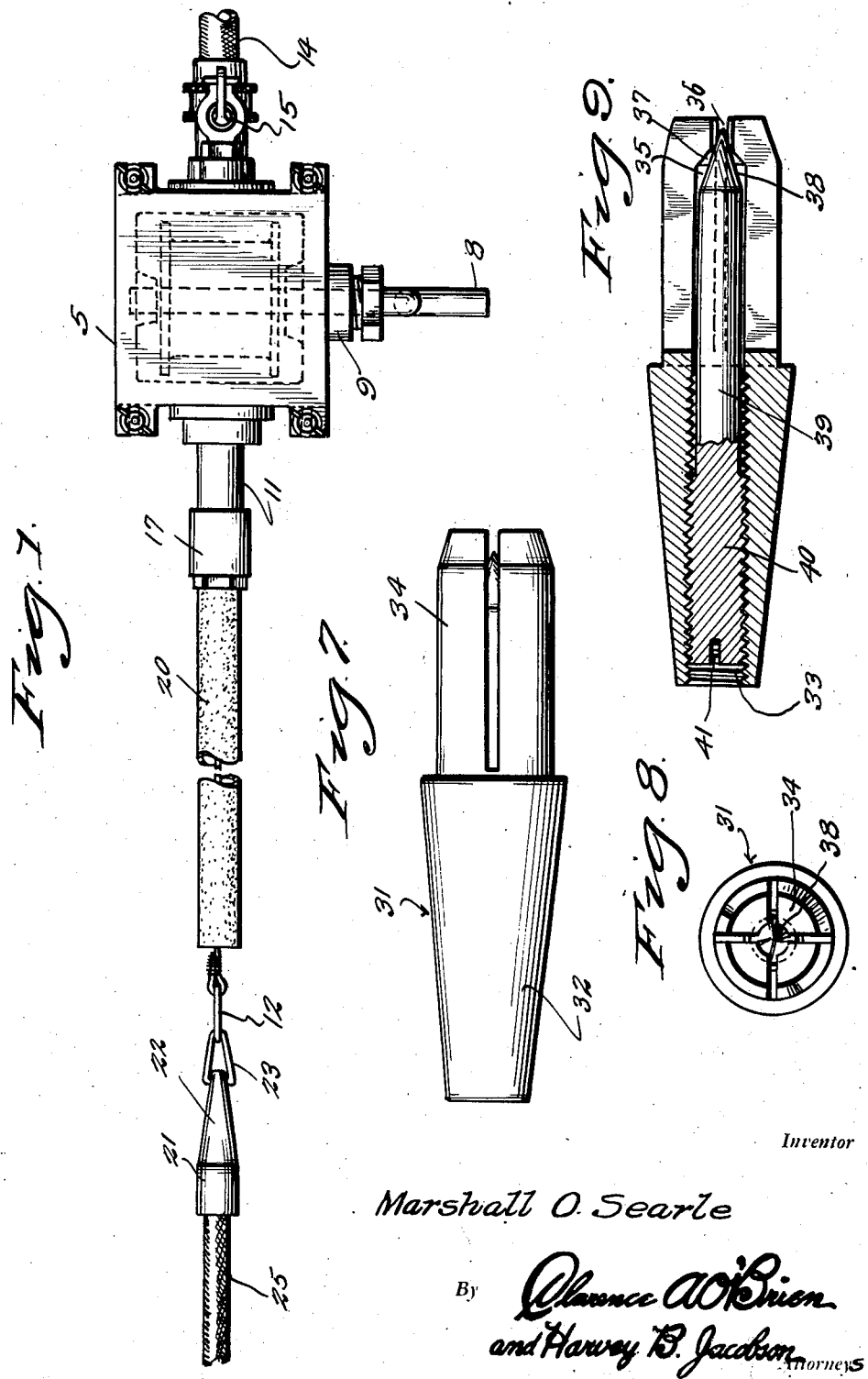

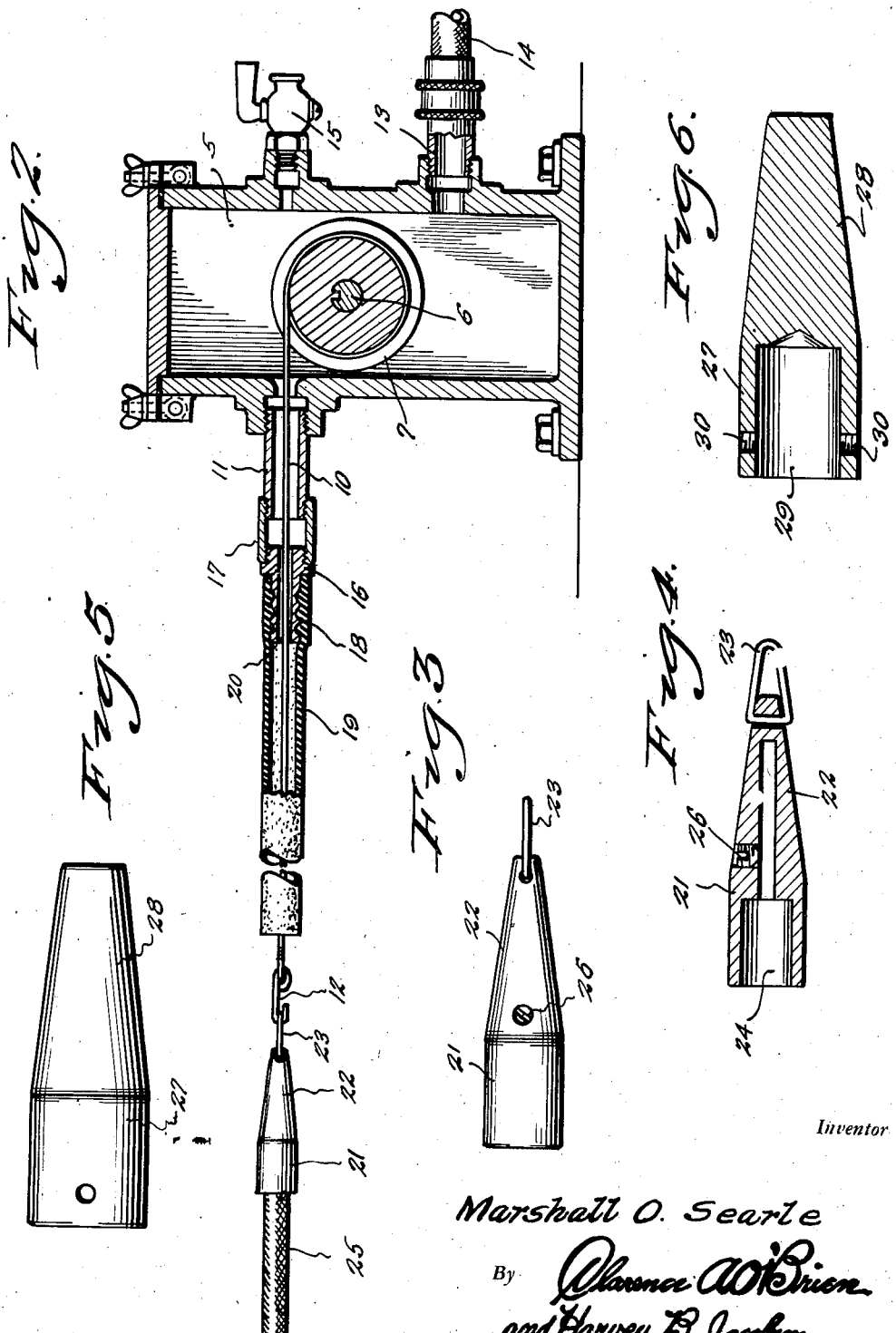

2,359,532

UNITED STATES PATENT OFFICE 2,359,532

APPARATUS FOR APPLYING INSULATING TUBING ON WIRE CABLES, CONDUITS, AND THE LIKE

Marshall O. Searle, Beverly Hills, Calif.

Application May 2, 1942, Serial No. 441,492

3 Claims. (Cl. 29—234)

The present invention relates broadly to the application of rubber tubing over flexible or rigid conduits, wire cables, or other electric or fluid carriers and more particularly to the application of insulating tubing over flexible metal conduits as used in aircraft wiring systems.

An important object of the present invention is to provide fittings for the cable or conduit adapted for guiding the rubber tubing over the cable or conduit when such tubing is expanded by air pressure.

A further object is to provide means for expanding the rubber tubing in order to facilitate the placing of the tubing over the conduit or cable, as the case may be.

A still further object is to provide an apparatus of this character of simple and practical construction, which is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 1 is a top plan view showing the rubber tubing expanding device with one of the fittings attached to an electric cable and in position for feeding the cable into the tubing.

Figure 2 is a vertical sectional view of the tubing expanding device.

Figure 3 is a side elevational view of the fitting employed for attaching to an electric cable.

Figure 4 is a longitudinal sectional view through the fitting.

Figure 5 is a side elevational view of a type of fitting adapted for attaching to a flexible metal conduit.

Figure 6 is a longitudinal sectional view thereof.

Figure 7 is a side elevational view of an expansible fitting for attaching to the inside of a hollow flexible conduit.

Figure 8 is an end elevational view thereof.

Figure 9 is a longitudinal sectional view thereof.

Figure 10 is a front elevational view of a work bench for supporting the flexible conduits when using the fittings illustrated in Figures 5, 6 and 7, and Figure 11 is a fragmentary longitudinal sectional view of the conduit on the supporting rod.

Referring now to the drawings in detail, and with particular reference to Figures 1 and 2 of the drawings, the numeral 5 designates a compressed air chamber having a shaft 6 journaled in the wall thereof on which is mounted a reel or drum 7 within the chamber, the shaft projecting outwardly through one wall of the chamber and provided thereon with an operating crank 8, the shaft being provided with suitable packing means 9.

A wire cable 10 is wound on the reel 7 and projects outwardly of the chamber through a nipple 11, the outer end of the wire having a hook 12 attached thereto.

A fitting 13 communicates with the chamber 5 and is provided with an air supply hose 14 leading to a suitable source of supply for feeding air under pressure to the chamber. A petcock 15 is connected to the chamber to release the compressed air therein when desired.

An adapter 16 is connected to the nipple 11 by means of a union 17, the adapter having an extension 18 thereon to which one end of a flexible rubber tubing is adapted for attaching, the extension having a bore 20 therein through which the wire 10 extends for projection through the tubing, as shown to advantage in Figure 2 of the drawings.

A guide fitting 21, of a type illustrated in Figures 3 and 4 of the drawings, is provided with a tapered end 22 to which is attached a ring 23 for engagement by the hook 12, the diameter of the fitting 21 being slightly in excess of the bore of the rubber tube 19 so that when the tapered end 22 of the fitting is inserted in the outer end of the rubber tube, the tube will be closed so as to enable the expansion of the tube by air pressure from the chamber 5.

The fitting 21, at its rear end, is provided with a bore 24 adapted for receiving one end of a wire cable 25, which is secured therein by means of a set screw 26.

Accordingly, through the operation of the crank 8 the wire 10 will be drawn into the rubber tubing 19 thus pulling the fitting 21 and wire cable 25 into the tubing for covering the cable with the rubber tubing, the insertion of the fitting and cable being facilitated by the expansion of the rubber tubing by the compressed air from the chamber 5 in a manner as will be apparent.

In Figures 5 and 6 of the drawings I have illustrated a type of fitting, designated at 27, for attaching to flexible metal conduits of a type used in aircraft wiring systems, the fitting being provided with a tapered end 28 adapted for guiding the fitting into the outer end of the rubber tubing, the opposite end of the fitting being provided with a bore 29 for receiving the end of the flexible conduit, which is secured therein by means of set screws 30. In this type of fitting the flexible metal conduit is of sufficient rigidity to permit the fitting to be forced through the rubber tubing without requiring the same to be pulled therethrough by the wire 10 and the reel 7, the rubber tubing being, of course, expanded by the air pressure as heretofore explained.

In Figures 7 to 9, inclusive, I have illustrated a type of fitting, designated generally at 31, for attaching to the inside of flexible metal conduits, the fitting including a tapered head 32 having a threaded bore 33 extending therethrough, the large end of the head terminating in a longitudinally split stem 34 also having a bore 35 extending therethrough communicating with the bore 33 of the head.

The bore 35, adjacent its outer end is reduced as shown at 36 and includes a tapered portion 37 adapted for engagement by the tapering end 38 of an expanding pin 39 having a threaded rear end 40 for threading through the bore 33 of the head, whereby to expand the stem 34 into frictional engagement with the inner wall of a flexible metal tubing.

The outer end of the expanding member 39 is formed with a kerf 41 for receiving a screw driver or similar tool to adjust the expanding member 39 longitudinally in the fitting.

From the foregoing it will be apparent that the fittings designated at 21, 27 and 31 constitute guides for feeding the wire cable, flexible or rigid conduits, or other electric or fluid carriers through the rubber tubing 19 so that the tubing may be placed over the cable or conduits, as the case may be, to provide the desired insulation therefor.

It will be understood the tubing 20 may be constructed of natural or synthetic rubber.

In order to prevent buckling of the flexible conduit C when using the type of fittings illustrated in Figures 5, 6 and 7 for applying the rubber tubing, I provide a supporting rod 42 which is inserted in the conduit, as shown in Figures 10 and 11, one end of the rod being secured in one face of a block 43 secured to a work bench 44 by screws 45, the rod and conduit being supported in a horizontal position above the bench in a convenient position for guiding the expanded rubber tubing thereon.

The tubing extends to an air supply pipe 46 having a valve 47 therein which is controlled by a cable 48 from a foot treadle 49 adjacent the bench.

It is believed the details of construction, manner of use and advantages of the devices will be readily understood from the foregoing without further detailed explanation.

Having thus described the invention what I claim is:

1. Means for covering a conductor with a rubber insulation tubing and comprising a guide tip, means for detachably securing the tip to the conductor, said tip being adapted to close one end of the tubing, means for expanding the tubing to facilitate passage of the tip therethrough and including a fluid chamber to which the other end of the tubing is connected, said fluid chamber being adapted to supply fluid under pressure to the tubing, and means within the chamber extending through the tubing and connected to the tip for pulling the tip and conductor therethrough.

2. Means for covering a conductor with a rubber insulation tubing and comprising a guide tip, means for detachably securing the tip to the conductor, said tip being adapted to close one end of the tubing, a compressed air chamber, means connecting the other end of the tubing to the chamber for expanding the tubing to facilitate passage of the tip therethrough, a reel in the chamber, a flexible member carried by the reel and extending through the tubing for attaching to the tip, and means for operating the reel to draw the tip and conductor through the tubing.

3. Means for covering a conduit with a flexible insulation tubing and comprising a guide tip carried by the conductor and closing one end of the tube, and a combined tip drawing and tubing expanding device adapted for attaching to the other end of the tubing and including means for drawing the tip and conductor through the tubing and means for expanding the tubing during the drawing action.

MARSHALL O. SEARLE.